United States Patent
Shepard et al.

(10) Patent No.: US 11,222,556 B2
(45) Date of Patent: Jan. 11, 2022

(54) VISUAL COMMUNICATION SYSTEM

(71) Applicant: Waymo LLC, Mountain View, CA (US)

(72) Inventors: Ralph Hamilton Shepard, Menlo Park, CA (US); Pierre-Yves Droz, Los Altos, CA (US); Simon Verghese, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 317 days.

(21) Appl. No.: 16/219,276

(22) Filed: Dec. 13, 2018

(65) Prior Publication Data

US 2020/0193878 A1 Jun. 18, 2020

(51) Int. Cl.
| | |
|---|---|
| *G09F 13/04* | (2006.01) |
| *G09F 21/04* | (2006.01) |
| *G09F 13/22* | (2006.01) |
| *G09F 9/33* | (2006.01) |
| *G09F 13/30* | (2006.01) |

(52) U.S. Cl.
CPC ............ *G09F 13/0413* (2013.01); *G09F 9/33* (2013.01); *G09F 13/22* (2013.01); *G09F 13/30* (2013.01); *G09F 21/04* (2013.01); *G09F 13/044* (2021.05); *G09F 2013/222* (2013.01)

(58) Field of Classification Search
CPC ...... G09F 13/0413; G09F 13/22; G09F 13/30; G09F 21/04
See application file for complete search history.

(56) References Cited

U.S. PATENT DOCUMENTS

| | | | |
|---|---|---|---|
| 7,561,036 B2 | 7/2009 | Pederson | |
| 8,638,209 B1 * | 1/2014 | Oskroba | G09F 9/302 340/480 |
| 8,875,426 B2 | 11/2014 | Wagner | |
| 9,035,786 B2 | 5/2015 | Clifford et al. | |
| 9,809,157 B2 | 11/2017 | Cunningham, III et al. | |
| 9,902,311 B2 | 2/2018 | Sweeney | |
| 9,904,375 B1 | 2/2018 | Donnelly et al. | |
| 10,120,079 B2 | 11/2018 | Pennecot et al. | |
| 2003/0227375 A1 | 12/2003 | Yong | |
| 2018/0292916 A1 | 10/2018 | Donnelly et al. | |

FOREIGN PATENT DOCUMENTS

| | | |
|---|---|---|
| CN | 105655369 A | 6/2016 |
| CN | 206019637 U8 | 11/2018 |

OTHER PUBLICATIONS

International Search Report and Written Opinion for Application No. PCT/US2019/065175 dated Mar. 30, 2020.
"Lyft Patents Notification System for Self-Driving Cars to Communicate", [online]. [Retrieved Dec. 17, 2018] Retrieved from the internet: <https://www.dezeen.com/2018/12/14/lyft-patent-notification-system-self-driving-cars/>, 8 pages.

* cited by examiner

*Primary Examiner* — Thomas M Sember
(74) *Attorney, Agent, or Firm* — Botos Churchill IP Law

(57) ABSTRACT

This technology relates to a display mounted messaging system. The display mounted messaging system may include a light emitting diode (LED) display attached to a housing of a sensor. The housing of the sensor may rotate. The display mounted messaging system may also include an LED controller which is configured to selectively activate and deactivate at least one LED in the LED display, to provide a message in the direction of an intended recipient.

22 Claims, 13 Drawing Sheets

VISUAL COMMUNICATION SYSTEM

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using sensors such as cameras, radar, LIDAR sensors, and other similar devices. For instance, the perception system and/or the vehicle's computing devices may process data from these sensors in order to identify subjects as well as their characteristics such as location, shape, size, orientation, heading, acceleration or deceleration, type, etc. This information is critical to allowing the vehicle's computing systems to make appropriate driving decisions for the vehicle.

SUMMARY

Aspects of the disclosure are directed to display mounted messaging system. The display mounted messaging system may include a light emitting diode (LED) display attached to a housing of a sensor, wherein the housing of the sensor rotates; and a LED controller, wherein the LED controller selectively activates and deactivates at least one LED in the LED display, to provide a message in a direction of an intended recipient.

In some instances, the at least one LED in the LED display may be part of a LED strip comprising a plurality of LEDs. In some examples, the LED display may include two or more LED strips. In some examples, the one or more strips of LEDs may be mounted to one or more supports, and the one or more a supports may be attached to the housing of the sensor. In some examples, the plurality of LEDs of the LED strip may be integrated into the sensor housing.

In some instances, the system may include a motor, wherein the motor is configured to rotate the housing of the sensor and the LED display simultaneously. In some examples, the LED display and the housing of the sensor may rotate at the same rate. In some examples, the LED display may include two or more LED strips comprising a plurality of LEDs, and the at least one LED in the LED display is part of at least one of the two or more LED strips.

In some instances, the system may include one or more lenses, wherein the one or more lenses are configured to redirect light emitted by the at least one LED.

In some instances, the system may include one or more lenses, wherein the one or more lenses are configured to redirect light emitted by the at least one of the plurality of LEDs. In some examples the one or more lenses may be configured to move relative to the LED strip. In some examples, the system may include a motor configured to move the one or more lenses. In some examples, the LED strip may be configured to move relative to the one or more lenses. In some examples, the system may include a motor configured to move the LED strip. In some examples, the one or more lenses may be configured to redirect the light to one or more heights. In some instances, the one or more lenses may be configured to redirect the light toward the intended recipient. In some examples, the one or more lenses are integrated into the sensor housing.

In some instances, the sensor may be mounted on a vehicle. In some examples, an intended recipient may be a subject in the vehicle's vicinity having a probability interacting with the vehicle which satisfies a threshold level.

In some instances, the system may include the vehicle.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

This technology relates to a messaging system on the housing of a sensor for targeted visual communication. Human drivers typically utilize eye contact and gestures to communicate with other drivers, pedestrians, cyclists, vehicles, or other subjects (collectively referred to as "recipients"). For instance, human drivers may wave their hand at a recipient, such as a pedestrian at an intersection, to indicate that they are yielding to the pedestrian. Autonomous and semi-autonomous vehicles must rely on alternative means of visual communication, such as external displays to provide similar indications to nearby recipients. However, conventional external displays require additional hardware be installed. Moreover, these external displays are unable to provide targeted information to an intended recipient. Therefore, a message such as "I'm yielding to you," on an external display might be observed by recipients other than the intended target leading to confusion and potentially, a dangerous situation.

To address these issues, a light emitting diode (LED) messaging system including an LED display may be mounted on the housing of a sensor to provide targeted visual communication with nearby recipients. For example, a sensor, such as sensor 101 may have a sensor housing 110. As the sensor housing 110 rotates in a first direction 130, LED strips 120 and 122 mounted, integrated, or otherwise attached to the sensor may also rotate. Subsets of the LEDs on the LED strips 120 and 122 may be selectively activated and deactivated to provide messages in the direction of particular recipients while remaining blank, or displaying different messages in the direction of different recipients. Messages may include animations, images, text, single or multiple colors, or other such visual details capable of being output by a display.

The features described herein may allow for a vehicle to provide notifications and interact with subjects in its vicinity. As the LED displays are integrated into or mounted onto the sensor housing, the notification system does not require significantly more hardware and/or would not require significantly modifying the profile of the vehicle. Additionally, the LED displays are small enough to reduce or eliminate interference with the operation of the sensor in the sensor housing. Additionally, the LED displays described herein may operate at the rotational speed of the sensor and/or sensor housing, thereby avoiding the need to alter the sensor or sensor housings rotational speed for the LED display. Moreover, the LED displays described herein may provide targeted information to an intended recipient in contrast with a basic display. Therefore, a message such as "I'm yielding to you," on the LED display can be shown to the intended recipient, while others are unable to see the message. As a result, confusion around the intended recipient is avoided.

Example Systems

Figure 1:
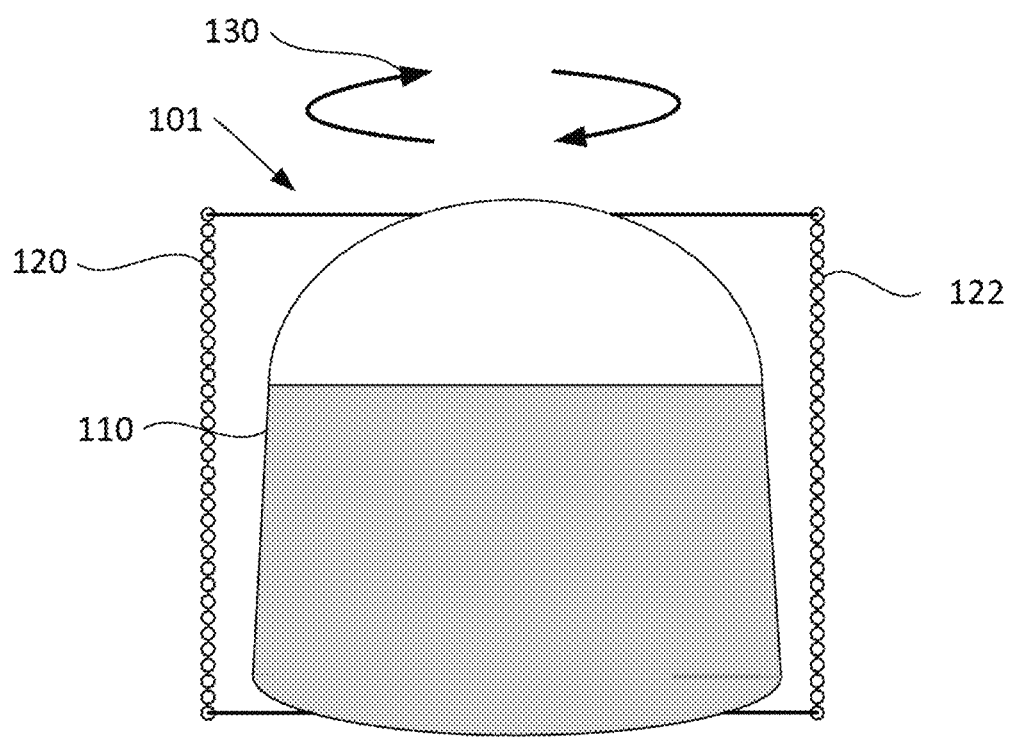
FIG. 1 is an example of a sensor and LED display configuration in accordance with aspects of the disclosure.
Figure 2:
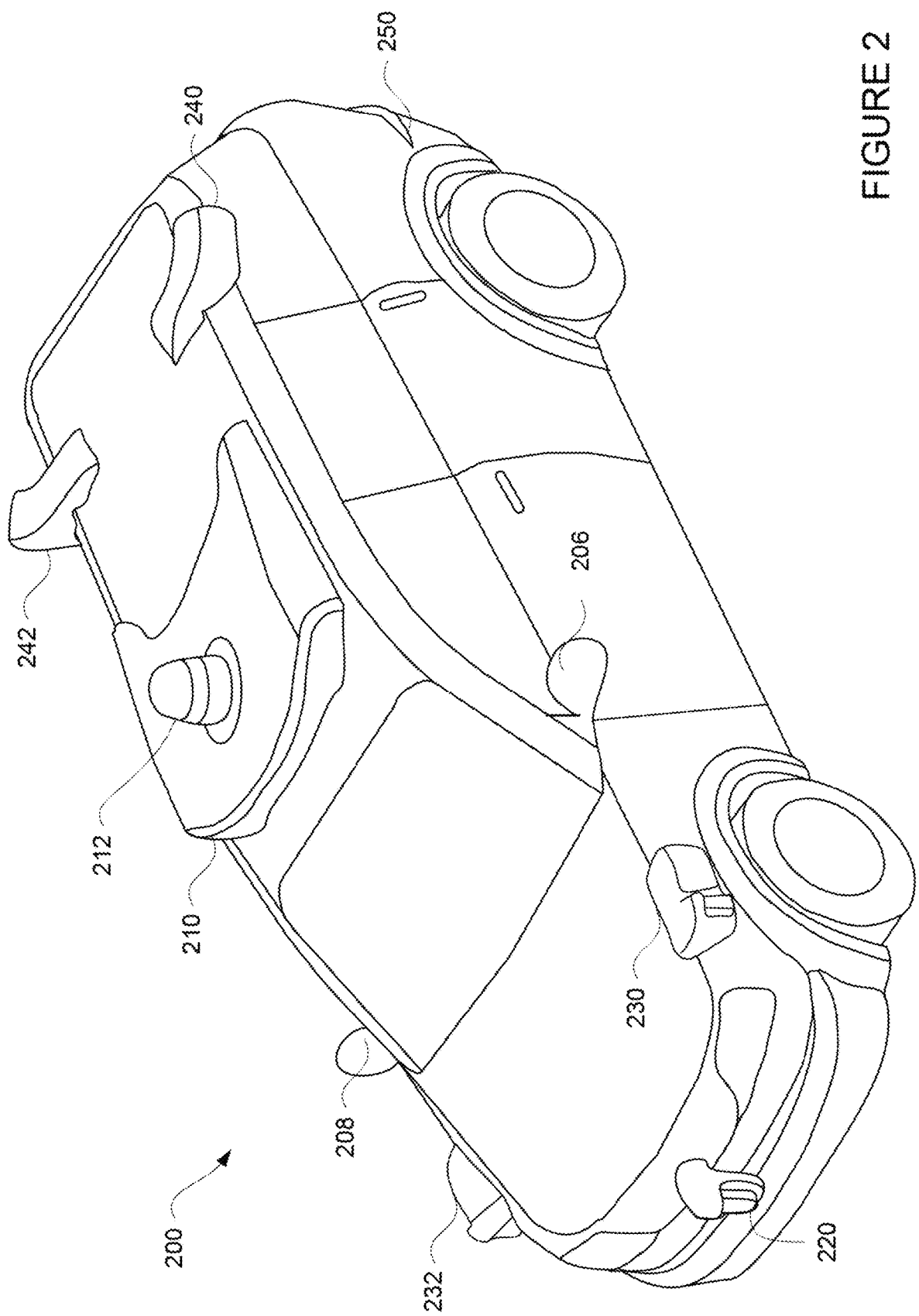
FIG. 2 is an example of a vehicle and sensor housings in accordance with aspects of the disclosure.

A vehicle may have one or more sensors to detect subjects external to the vehicle such as other vehicles, obstacles in the roadway, pedestrians, animals, cyclists, traffic signals, signs, trees, etc. For example, the vehicle 200, as shown in FIG. 2, may include sensors, such as sensor 101 in FIG. 1. Such sensors may include lasers, sonar, radar, cameras, microphones, speakers, and/or any other detection devices that capture images and/or sound and that which record data which may be processed by computing devices within the vehicle. The vehicle's sensors, such as LIDAR, radar, cameras, sonar, etc. may capture images and detect subjects and their characteristics such as location, orientation, size, shape, type, direction and speed of movement, etc. Images may include the raw (i.e., unprocessed) data captured by the sensors and/or pictures and videos captured by camera sensors. Images may also include processed raw data. For instance, the raw data from the sensors and/or the aforementioned characteristics can be quantified or arranged into a descriptive function or vector for processing by the computing devices. The images may be analyzed to determine the vehicle's location, and to detect and respond to subjects when needed.

The sensors may be arranged around the vehicle's exterior or interior. For example, housings 220, 230, 232, 240, and 242, may include, for example, one or more LIDAR devices. The sensors may also be incorporated into the typical vehicle components, such as tail lights/turn signal lights 250 and/or side view mirrors 206, 208. In some instances a laser, radar, sonar, camera or other sensors may be mounted on the roof, such as in housing 212, attached to mount 210.

Figure 3:
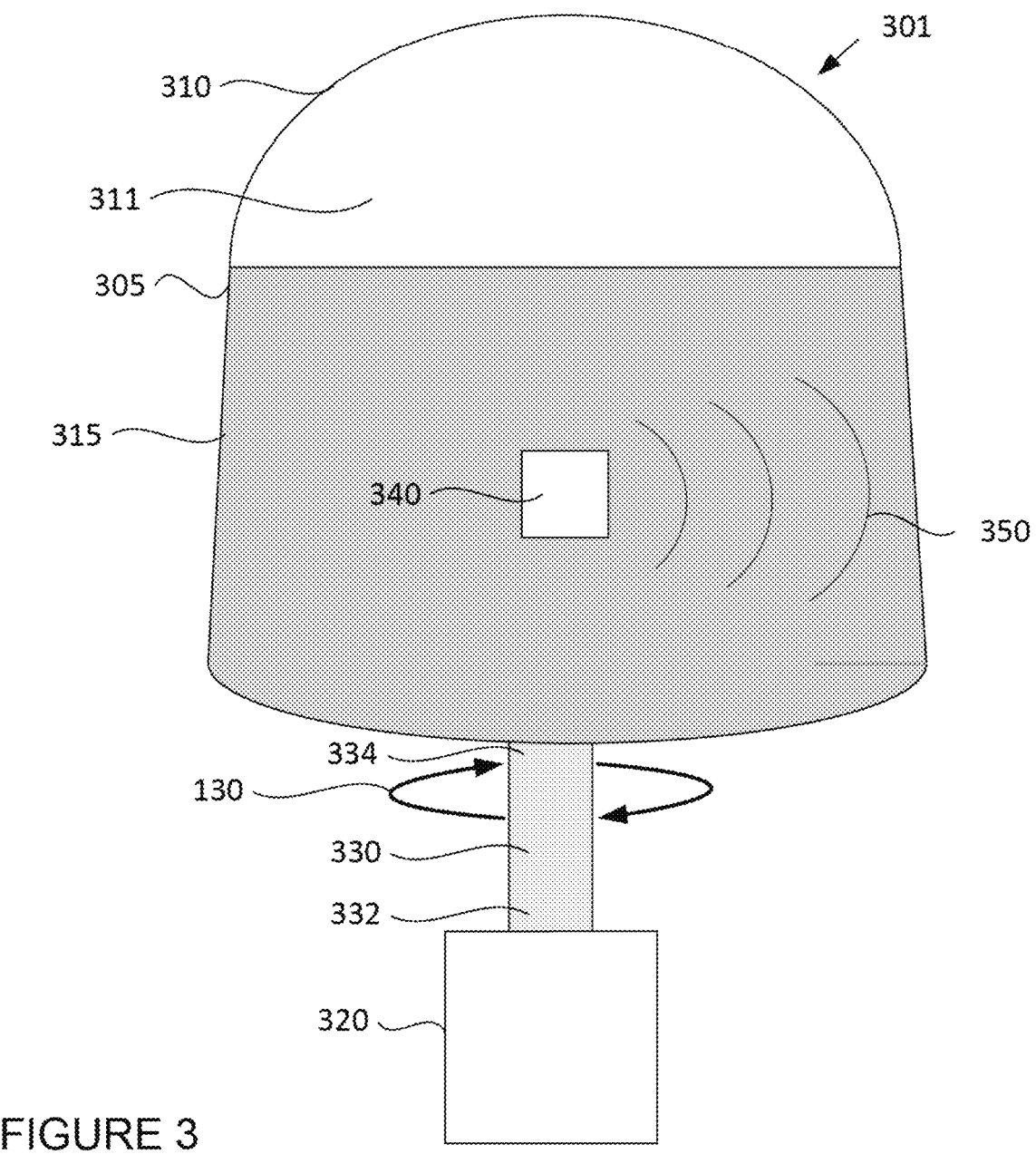
FIG. 3 is an example of a sensor attached to a motor in accordance with aspects of the disclosure.

A vehicle sensor, such as sensor 301 in FIG. 3, may be comprised of internal sensor components 340, a sensor housing 310 for housing the internal sensor components, and a cover window 315. The cover window 315 may be constructed at a specific location on the sensor housing 310 and the internal sensor components 340 may transmit and receive one or more signals through the cover window (as illustrated by markings 350). In this regard, the internal sensor components 340 may include one or more range-finding and/or imaging sensors such as LIDAR, radar, sonar, camera, or other such sensors positioned within the housing 310.

The sensor housing 310 may be configured in various shapes and sizes. For instance and as further shown in FIG. 3, the sensor housing 310 may be configured such that it has a domed shaped portion 311 with a side wall 305 in the shape of a frustum. The sensor housing 310 may be comprised of materials such as aluminum, magnesium, steel, plastic, glass, polycarbonate, polystyrene, acrylic, polyester, etc. Although FIG. 3 illustrates the sensor housing 310 in the shape of a frustum with a dome, the sensor may be configured in other shapes, or combinations of other shapes including spheres, cones, cubes, parallelepiped, hyperrectangle, pyramid, ellipsoid, cylinders, frustums, etc.

In some instances, the sensor housing 310 may not completely cover the sensor. In this regard, the sensor housing 310 may cover only a portion of the internal sensor components 340, while uncovered portions of the internal sensor components may be outside the sensor housing, e.g., within mount 210, or open to the environment external to the sensor. The sensor housing 310 may include one or more openings to the external environment or to the vehicle 200.

The sensor housing 310 may include a cover window through which the internal sensor components may transmit and receive signals. For instance, as further shown in FIG. 3, the entire side wall 305 of the sensor housing 310 may be constructed as a cover window 315, to allow signals, such as signals 350, to pass through the sensor housing 310. Although the entire side wall 305 is shown as being the cover window 315, in some instances only a portion or portions of the sidewall may be constructed as cover windows. The cover window 315 may be composed of the same, or different, material as the sensor housing 310. In some instances the entire sensor housing 310, or a large portion of the sensor housing, may be penetrable by the signals transmitted and received by the internal sensor components 340, thereby allowing the entire sensor housing 310 to function as a cover window.

The sensor may be attached to a motor via a sensor shaft. For instance, as further shown in FIG. 3, the sensor shaft 330 may have a first end 332 attached to a motor 320 and an opposite end 334 connected to the sensor 301 and housing 310. The motor may rotate the sensor shaft in a first direction 130 causing the entire sensor 301 to also rotate in the first direction at a speed of around 600 to 900 rpm, or more or less. In some embodiments the sensor shaft 330 may only rotate the sensor housing 310. In this regard, the sensor housing 310 may be mounted to a rotating plate (not shown), which is, in turn, connected, either directly or indirectly to the sensor shaft. The sensor shaft 330 may rotate the plate, which in turn may rotate the sensor housing 310.

An LED display may be integrated or otherwise attached to a sensor, such as sensor 301. The LED display may be a persistence of vision (POV) display or a directional display. As described herein, a POV display may provide detailed messages, such as text based messages or visual images. The messages displayed by the POV display may be visible by recipients in a large viewing angle, such as 180 degrees, or more or less. A directional display may provide less detailed messages than the POV display, but the messages can be directed to recipients in a narrow viewing angle, such as 10 degrees, or more or less. In other words, messages displayed by the directional display can be targeted to recipients within a narrow viewing angle, such that recipients outside of the narrow viewing angle are unable to view the messages or unlikely to clearly or fully discern the message.

Figure 4:
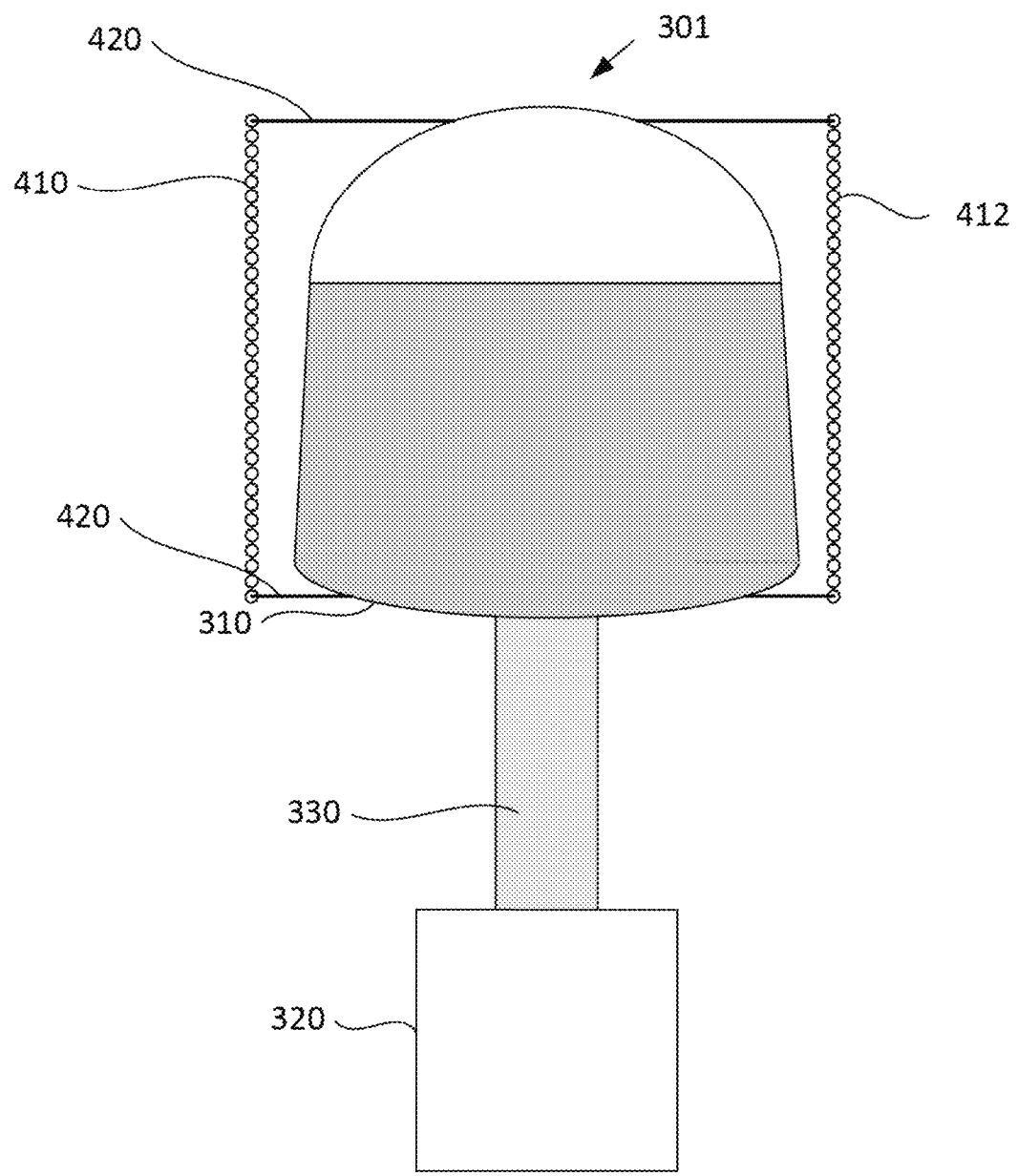
FIG. 4 is an example persistence of vision LED display in accordance with aspects of the disclosure.

A POV LED display may be comprised of one or more strips of LEDs. For example, LED strips 410 and 412 may be attached to a mounting bracket 420 as shown in FIG. 4. The mounting bracket 420 may be attached or otherwise mounted onto sensor housing 310. In some instances, the mounting bracket 420 may be connected to another portion of the sensor which rotates, such as the sensor shaft 330. As such, when the sensor housing 310 or sensor shaft 330 rotates, the mounting bracket 420 as well as LED strips 410 and 412 may also rotate, as further shown in FIG. 4.

Figure 5:
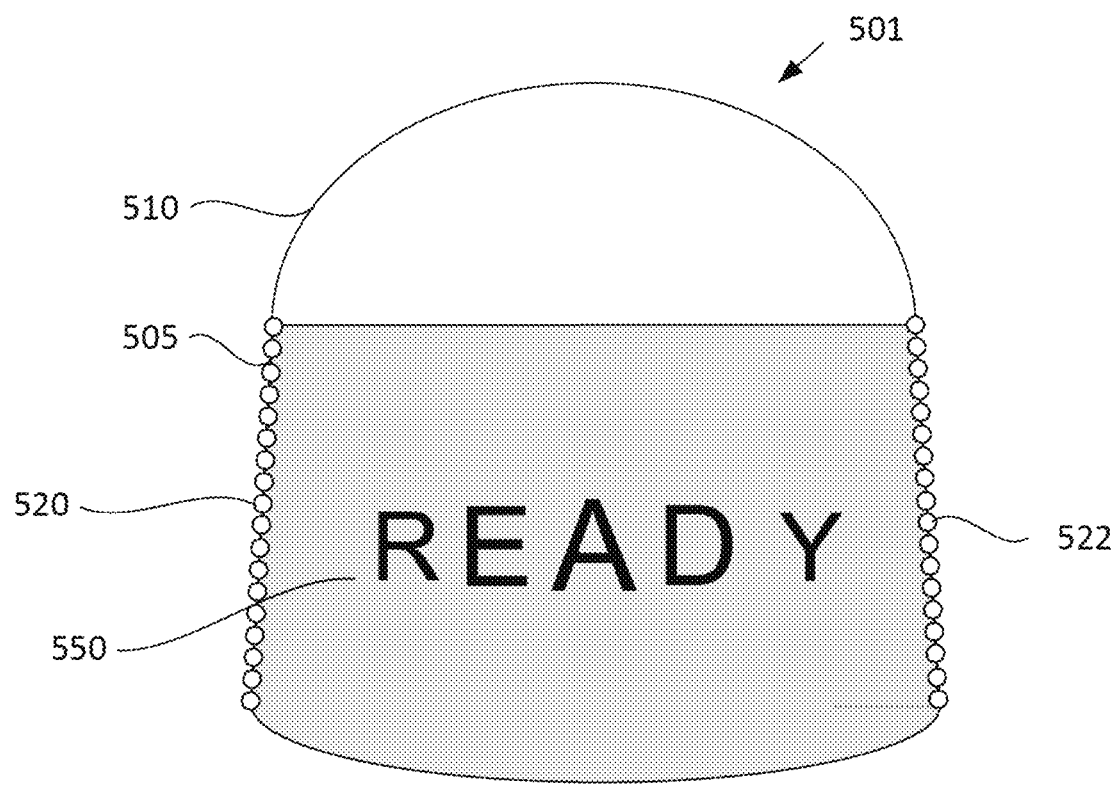
FIG. 5 is an example persistence of vision LED display in accordance with aspects of the disclosure.

In some instances, the one or more LED strips may be embedded, integrated, or otherwise directly attached to the sensor housing. For instance, and as shown in FIG. 5, LED strips 520 and 522, which may be similar to LED strips 410 and 412, may be embedded into the walls 505 of sensor housing 510 of sensor 501, which may be similar to sensor 301.

The LED display may be configured to provide messages in the direction of particular recipient while remaining blank, or displaying different messages in the direction of different recipients. For instance, the LED controller's activation and deactivation may result in recipients within a predefined viewing angle seeing a message 550, such as "READY", as shown in FIG. 5. Recipients outside of the predefined viewing angle may be shown a different message or no message at all. In this regard, a single LED display may provide different messages in different directions at the same time.

Figure 6A:
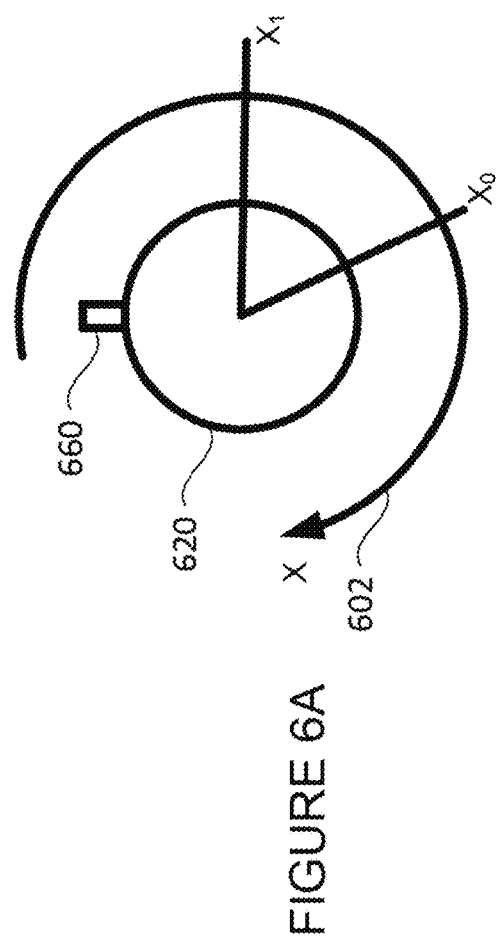
FIGS. 6A-6C are example illustrations of a LEDs on an LED display activating and deactivating in accordance the disclosure.
Figure 6B:
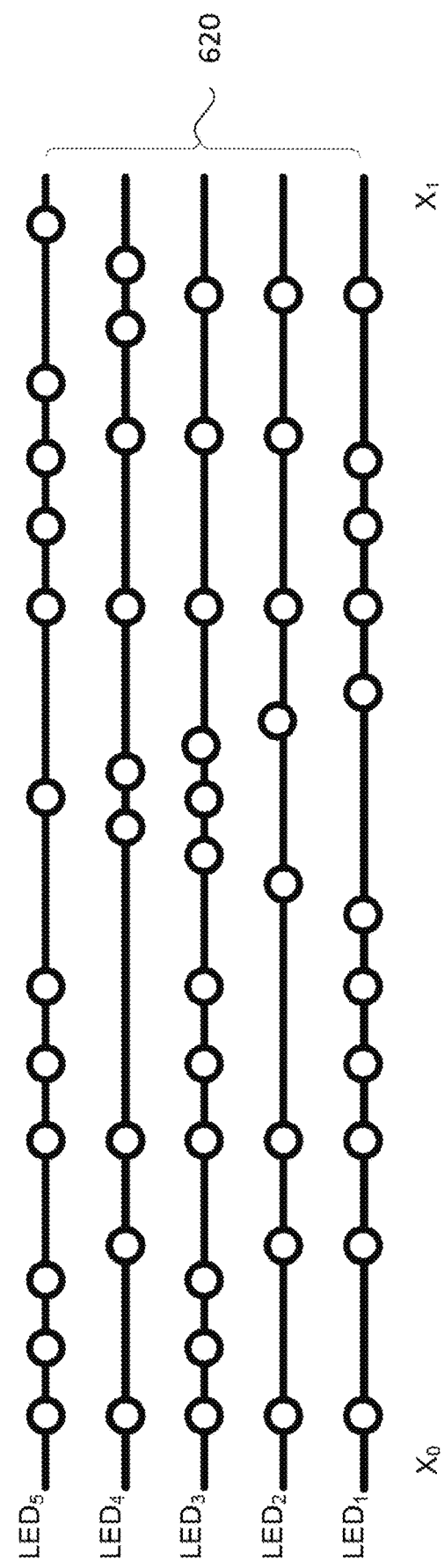
Figure 6C:
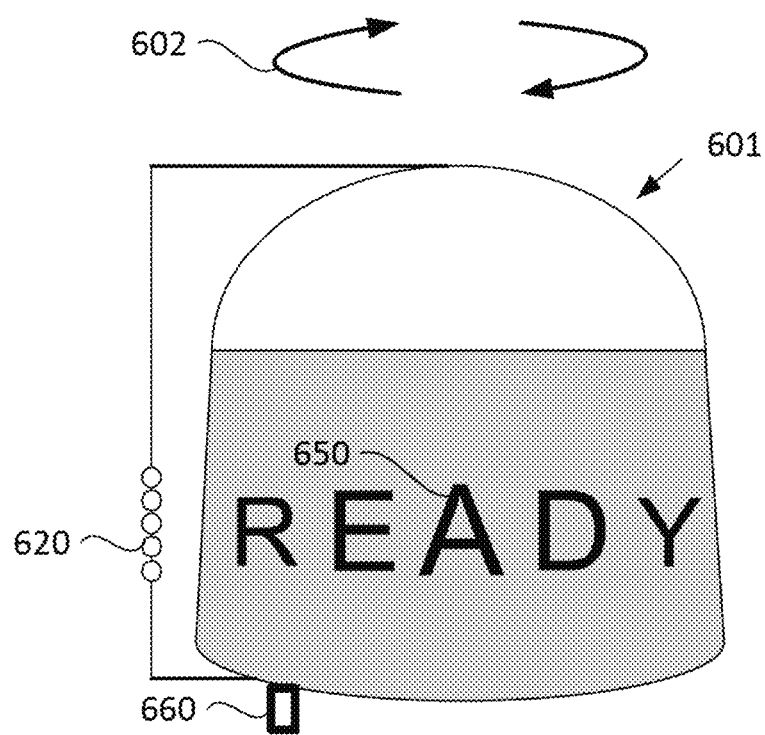

An LED controller may control the activation and deactivation of individual or groups of LEDs in the one or more strips of the POV LED display. In this regard, by activating and deactivating individual LEDs, the LED controller may control the message output by the LED display and the location where the message is displayed. For instance, and as shown in FIGS. 6A-6C, an LED controller 660 triggers the activation and deactivation of the LEDs on a five LED strip 620 (i.e., $LED_1$, $LED_2$, $LED_3$, $LED_4$, and $LED_5$,) as the LED strip rotates in a first direction 602 to generate a message 650 "READY" within a viewing angle defined between points $X_0$ and $X_1$. LED controller 660 may be positioned within the sensor housing or outside of the sensor housing, such as shown in FIGS. 6A and 6C.

The LED controller 660 may trigger the activation and deactivation of the LEDs on LED strip 620 to generate the message 650. For instance, as illustrated in FIGS. 6B and 6C, as the LED strip 620 rotates in the first direction 602 around sensor 601, which may be similar to sensor 501, the LEDs on the strip (i.e., $LED_1$, $LED_2$, $LED_3$, $LED_4$, and $LED_5$,) may each be illuminated for the length of time the respective LED is at locations between $X_0$ and $X_1$ corresponding to the message. Although the message 650 shown in FIGS. 6B and 6C is "READY" the message may include animations, images, text, single or multiple colors, or other such visual details capable of being output by the display. Moreover, the message may be displayed in any direction and need not be limited to locations between $X_0$ and $X_1$.

The POV LED display's rotational speed may control the clarity of the message. In this regard, a slowly rotating POV LED display may be unable to generate a visual message, as the lights from the LEDs would disappear or appear broken, before a recipient was able make out a message or be shown a clear message. To increase the clarity of the message, the POV LED display could rotate such that the LED strips operate at a rate of approximately 40 Hz, although it could rotate faster or slower. In this regard, the more LED strips used in the POV LED display, the slower the rotation of the POV display may be. For instance, when four evenly spaced strips of LEDs are used, the rotation rate may of the POV display may be 10 Hz (i.e., 600 rotations per minute), or more or less, and when two evenly spaced strips of LEDs, such as LED strips 520 and 522 shown in FIG. 5 are used, the rotation rate may be 20 Hz (i.e., 1200 rotations per minute), or more or less. In certain instances, the sensor housing and/or sensor may rotate at a speed of around 600 to 900 rotations per minute. A POV LED display having four evenly spaced LED strips may be rotated along with the sensor housing and/or sensor, such as sensor 301 and sensor housing 310, to provide a clear message without changing the operation of the sensor and/or sensor housing.

Figure 7:
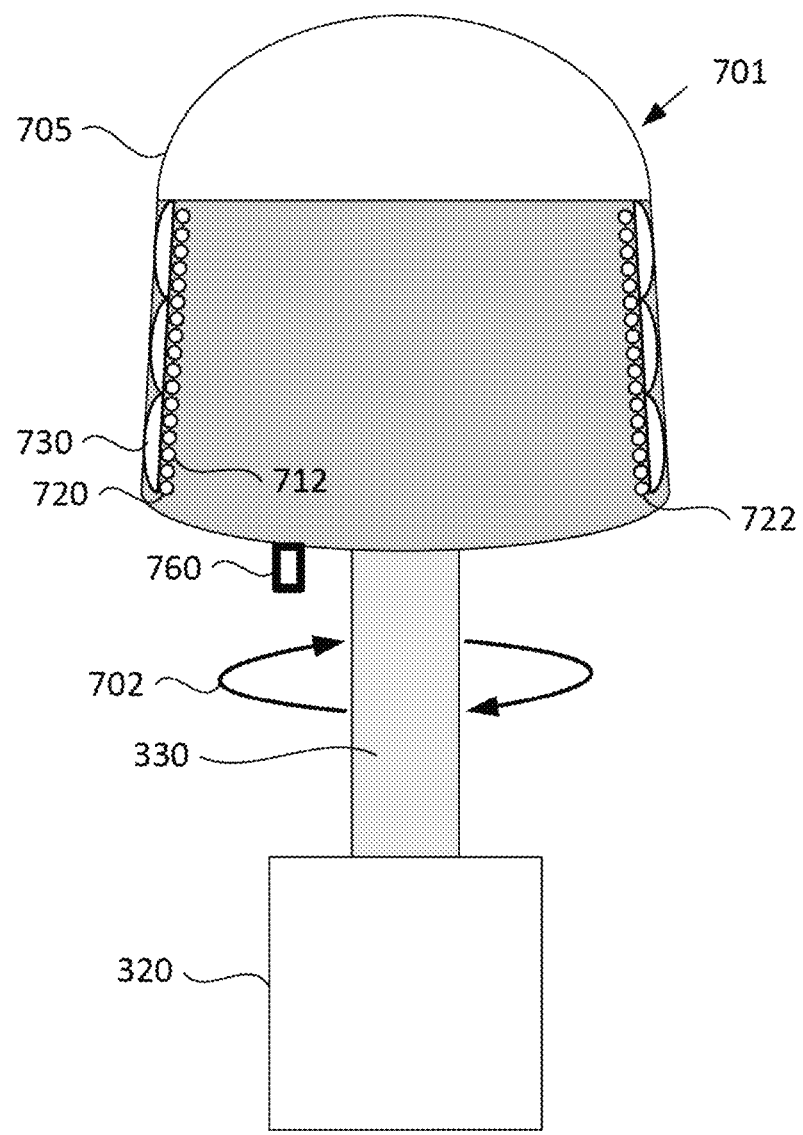
FIG. 7 is an example directional LED display in accordance with aspects of the disclosure.

The LED display may be a directional display, as shown in FIG. 7. As previously discussed, a directional display may, in some instances, provide less detailed messages than the POV display, but may be capable of providing messages to recipients within a narrow viewing angle. The directional display may include one or more LED strips integrated into to sensor housing. For example, directional LED strips 720 and 722 are integrated into sensor housing 705 of sensor 701, which may be similar to sensor 301. Accordingly, when a motor, such as motor 320 rotates the sensor housing 705 via the shaft 330, the LED strips also rotate in the direction illustrated by arrows 702, as further shown in FIG. 7.

Each LED of the LED strip may have a protective window, such as window 712 shown in FIG. 7, or all LEDs or groups of LEDs may share windows. As in the POV LED display, the directional display may include an LED controller 760 to control the activation and deactivation of individual LEDs or groups of LEDs.

To limit the viewing angle of the messages output by the directional display, one or more lenses may be positioned in front of the LEDs. In this regard, the azimuthal angular field of emission of the LEDs in the LED strips may be restricted to a particular viewing angle, such as 10 degrees, or more or less, via one or more lenses, such as lens 730 positioned outside of the LED window 712. The lenses, such as lens 730, may be any lens capable of focusing light such that it travels along an axis. The lenses, such as lens 730, may be mounted such that the lenses are flush with the sensor housing 705 to allow, for instance, wiper blades and sprayers to clear the sensor housing without interference from the lenses. Each LED may have a lens or one or more lenses may be shared by groups or all of the LEDs.

Figure 8B:
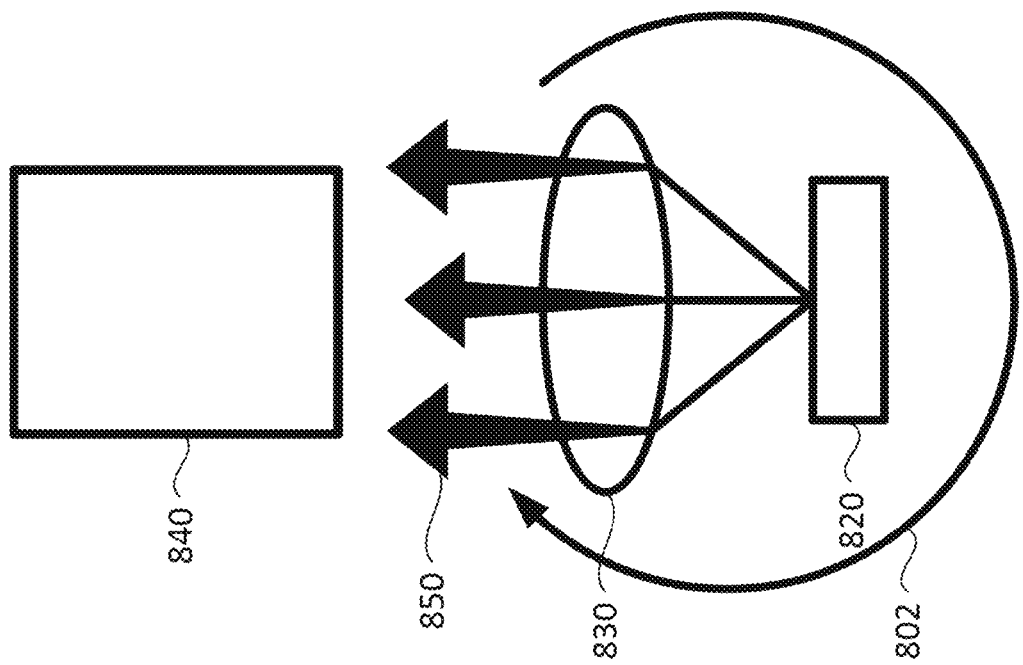
FIGS. 8A and 8B are example illustrations of a lens focusing light output by an LED in accordance with aspects of the disclosure.
Figure 8A:
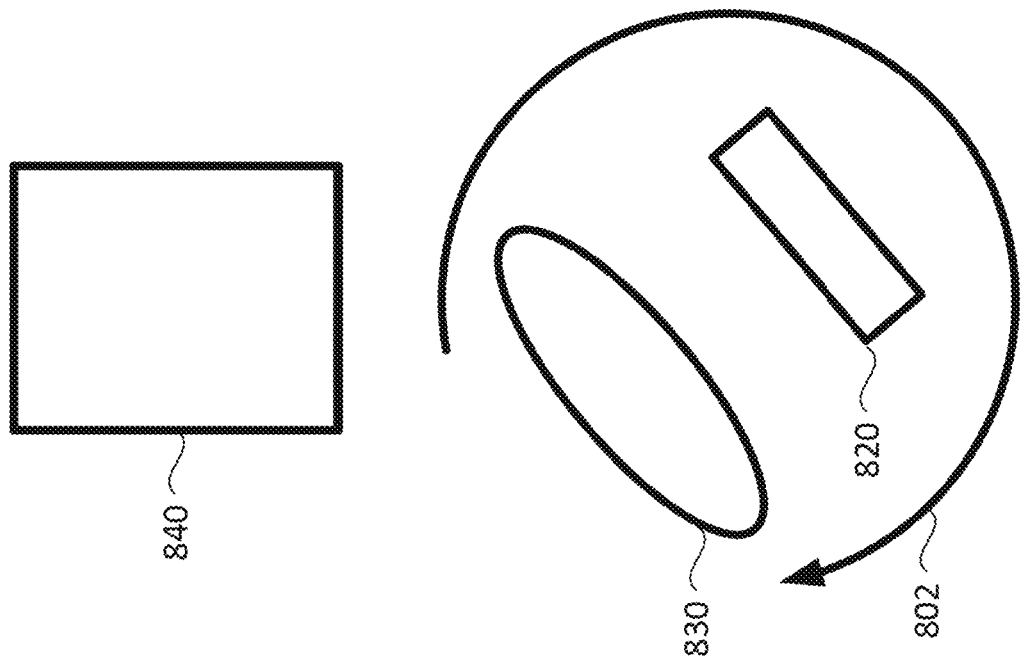

Each lens may capture light output by an LED and focus the light such that it is directed towards a recipient. For instance, and as shown in FIGS. 8A and 8B, a lens 830 may be positioned in front of LED 820. As the LED rotates in a direction 802, the LED may illuminate and light from LED 820 may be captured by the lens 830. The lens 830 may then direct the light (illustrated as arrows 850) towards a recipient 840.

Figure 9C:
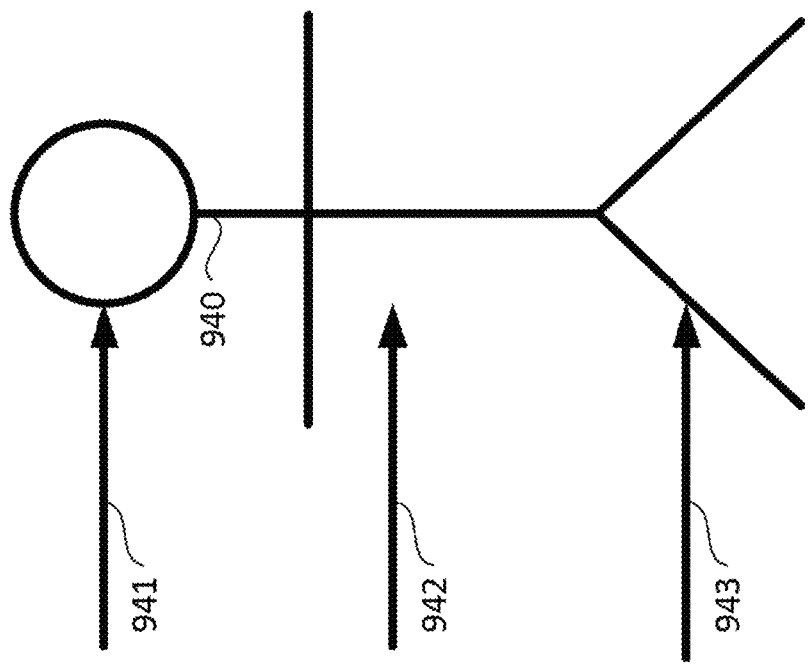
FIGS. 9A-9C are example illustrations of a lens focusing light output by an LED to a particular height accordance with aspects of the disclosure.
Figure 9A:
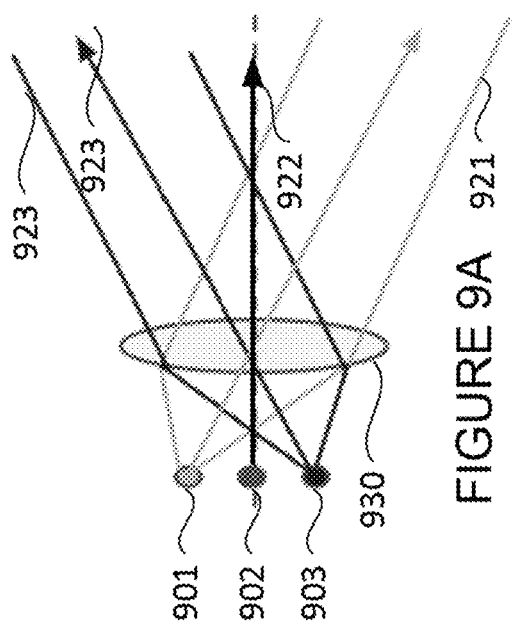

In some instances, the directional display may target the messages such that they are displayed at a particular height. In this regard, one or more lenses may be configured to focus light along one or more axes, such that the outputted light is directed to locations having differing heights. For example, and as shown in in FIG. 9A, a single lens 930 may capture light emitted from three LEDs 901-903 and direct it to three different heights. In this regard, the lens 930 may capture and direct light 921 from LED 901 towards a lower portion 943 of a recipient as shown in FIG. 9C, or towards the ground. Light 922 and 923 emitted from LEDs 902 and 903, respectively, may be directed by the lens 930 to the middle portion 942, which may occur when the recipient is seated, and upper portion 941 of the recipient, which may occur when the recipient is standing, as further shown in FIG. 9C. In some instances, the outputted light may be directed to different heights based on the recipient's height. For instance, a message intended for a first recipient may be at a first height at or near the first recipient's eye level, and a message intended for a second, shorter recipient may be output at a second, lower height at or near the second recipient's eye level.

Figure 9B:
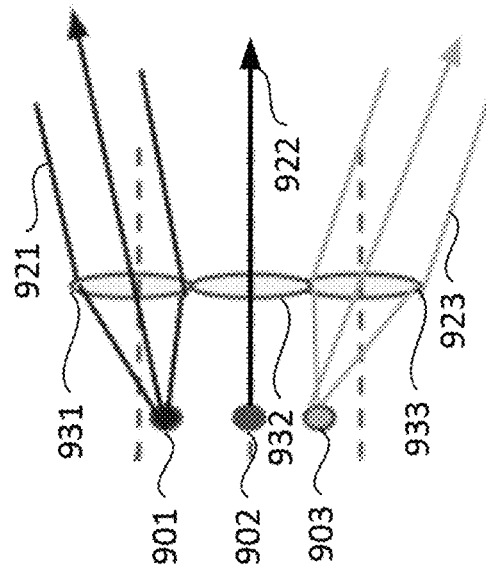

FIG. 9B shows a directional display configuration including three lenses 931-933. In this regard, lens 931 capture light 923 from LED 901 and directs it towards the upper portion 941 of recipient 940, as shown in FIG. 9C. Light 922 and 923 emitted from LEDs 902 and 903, respectively, may be directed by the lenses 932 and 933 to the middle portion 942 and lower portion 943 of the recipient, as further shown in FIG. 9C. In some instances, one or more lenses may be used to target the messages of the LED display such that they are targeted to a particular height and in a particular direction.

Figure 10A:
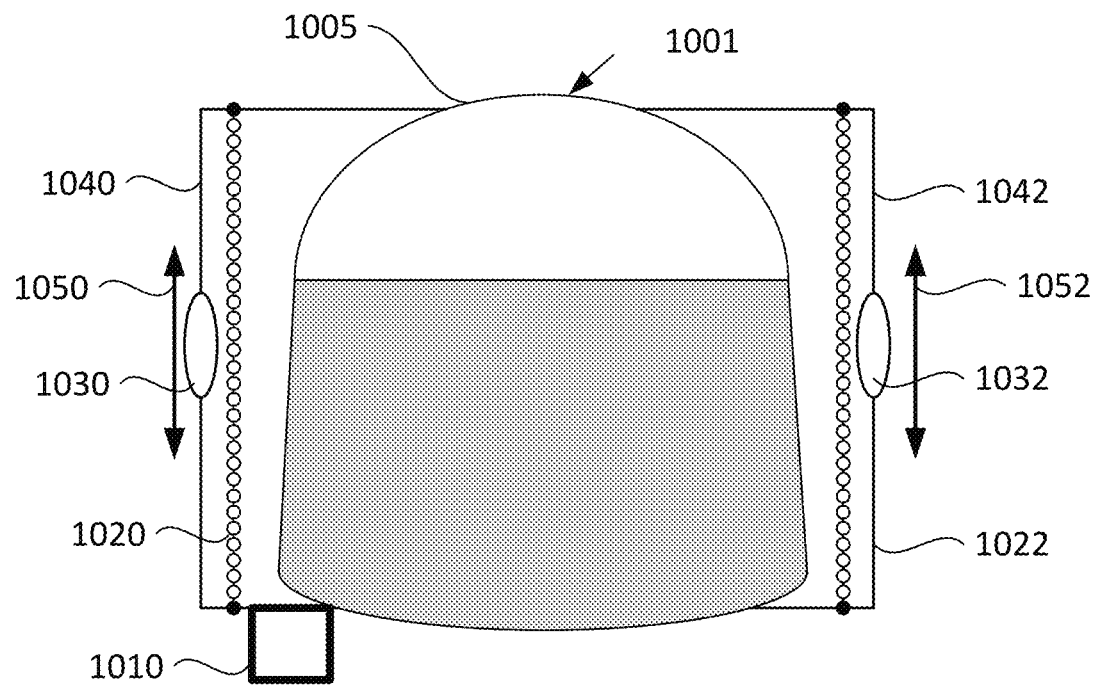
FIG. 10A is an example of an LED display having a moveable lens in accordance with aspects of the disclosure.

In some instances a direction display of a sensor, such as sensor 1001 shown in FIG. 10A, may include one or more lenses that move relative to the LEDs. The lenses may target the light emitted by the LEDs in a particular direction and/or height. In this regard, the lenses 1030 and 1032 may be moved along supports 1040 and 1042, as illustrated by arrows 1050 and 1052. A motor 1010 may control the movement of the lenses relative to the LED strips 1020 and 1022. The lenses 1030 and 1032 may be capable of directing light at the particular height and in the particular direction may be moved along the supports 1040 and 1042 to a position in proximity to the LEDs of the LED strips 1020 and 1022 which are outputting the light. As such, the light output by the LEDs may be redirected by the lens such that the light is directed to the particular height and/or the particular direction.

Figure 10B:
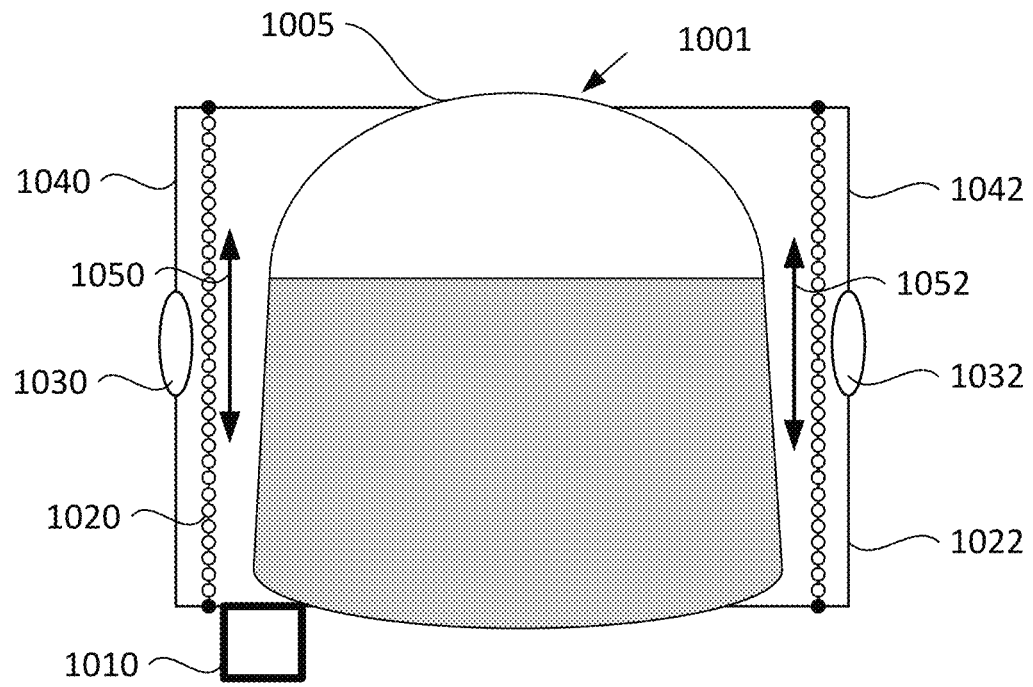
FIG. 10B is an example of an LED display having moveable LEDs in accordance with aspects of the disclosure.

In some instances the LEDs may be moved relative to the lens to target the light emitted by the LEDs in a particular direction and/or height. In this regard, the LEDs of the LED strips 1020 and 1022 may be moved along supports 1040 and 1042, respectively, relative to the lenses 1030 and 1032 by motor 1010, as shown in FIG. 10B. Although FIGS. 10A and 10B show only a single lens on each support, multiple lenses may be on each support. Moreover, the lenses, LED strips and/or supports may all be integrated into or otherwise positioned within the sensor 1001, which may be similar to sensor 301, and/or sensor housing 1005.

Figure 11:
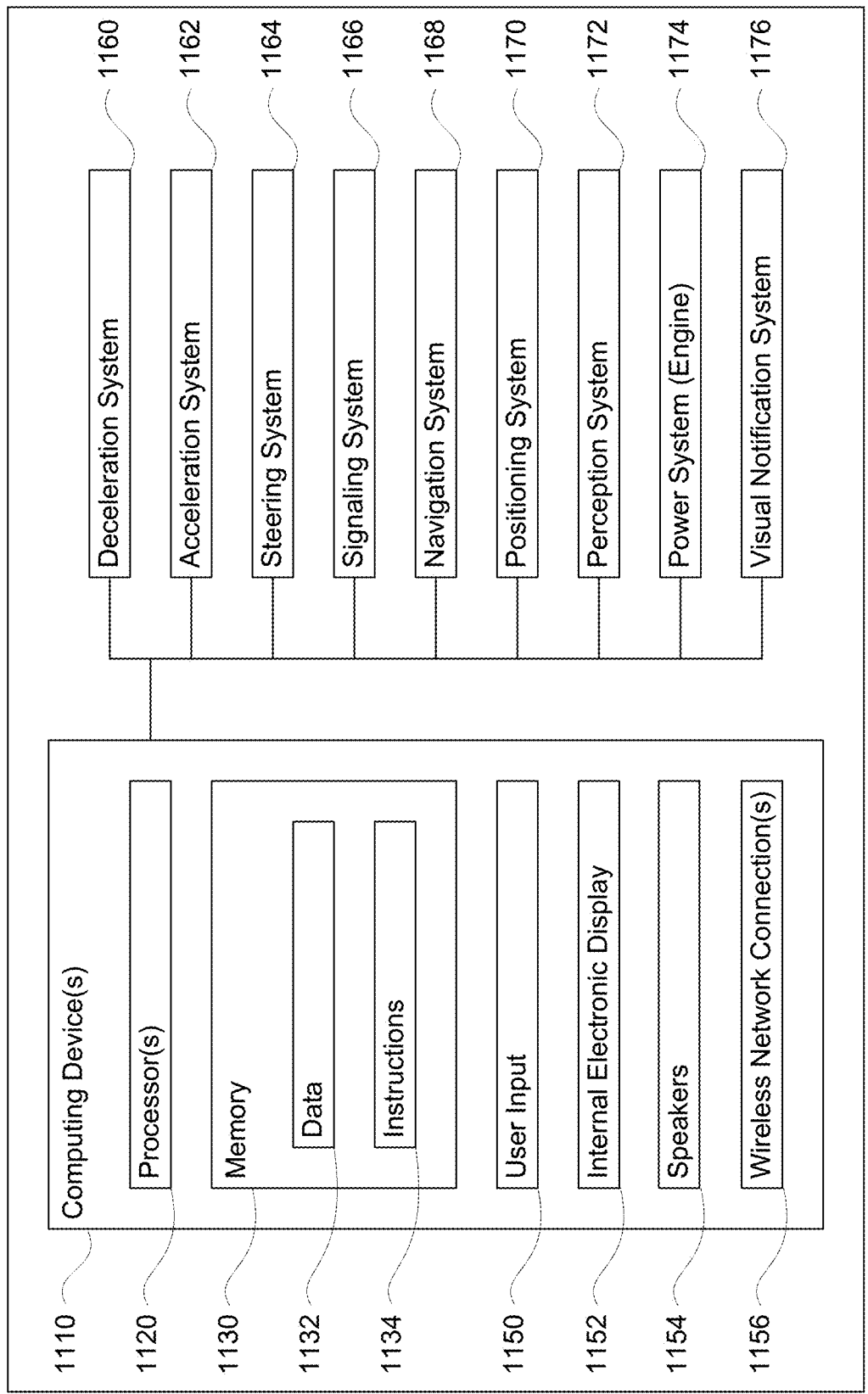
FIG. 11 is a functional diagram of an example vehicle in accordance with aspects of the disclosure.

As shown in FIG. 11, vehicle 200 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle 200 may have one or more computing devices, such as computing devices 1110 containing one or more processors 1120, memory 1130 and other components typically present in general purpose computing devices.

The memory 1130 stores information accessible by the one or more processors 1120, including instructions 1134 and data 1132 that may be executed or otherwise used by the processor 1120. The memory 1130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 1134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 1132 may be retrieved, stored or modified by processor 1120 in accordance with the instructions 1134. For instance, although the claimed subject matter is not limited by any particular data structure, the data may be stored in computing device registers, in a relational database as a table having a plurality of different fields and records, XML documents or flat files. The data may also be formatted in any computing device-readable format.

The processor 1120 may be any one or more conventional processors, such as commercially available CPUs. Alternatively, the one or more processors may be a dedicated device such as an ASIC or other hardware-based processor. Although FIG. 11 functionally illustrates the processor, memory, and other elements of computing devices 1110 as being within the same block, it will be understood by those of ordinary skill in the art that the processor, computing device, or memory may actually include multiple processors, computing devices, or memories that may or may not be stored within the same physical housing. For example, memory 1130 may be a hard drive and/or other storage media located in housing different from that of computing device 1110. Accordingly, references to a processor or computing device will be understood to include references to a collection of processors or computing devices or memories that may or may not operate in parallel.

Computing device 1110 may include all of the components normally used in connection with a computing device such as the processor and memory described above as well as one or more user inputs 1150 (e.g., a mouse, keyboard, touch screen and/or microphone) and various electronic displays (e.g., a monitor having a screen or any other electrical device that is operable to display information). In this example, the vehicle includes one or more internal electronic displays 1152 as well as one or more speakers 1154 to provide information or audio-visual experiences. In this regard, display 1152 may be located within a cabin of vehicle 200 and may be used by computing device 1110 to provide information to passengers or maintenance personnel within or otherwise in the vicinity of, the vehicle 200.

Computing device 1110 may also include one or more wireless network connections 1156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, Wi-Fi and HTTP, and various combinations of the foregoing. Computing device 1110 of vehicle 200 may also receive or transfer information to and from other computing devices (not shown), such as computing devices which contain or otherwise store further map or perception data.

In one example, computing device 1110 may control the computing devices of an autonomous driving computing system incorporated into vehicle 200. The autonomous driving computing system may capable of communicating with various components of the vehicle in order to control the movement of vehicle 200 according to primary vehicle control code stored in memory 1130. For example, computing device 1110 may be in communication with various systems of vehicle 200, such as deceleration system 1160, acceleration system 1162, steering system 1164, signaling system 1166, navigation system 1168, positioning system 1170, perception system 1172, and power system 1174 (i.e. the vehicle's engine or motor) in order to control the movement, speed, etc. of vehicle 200 in accordance with the instructions 1134 of memory 1130. Again, although these systems are shown as external to computing device 1110, in actuality, these systems may also be incorporated into computing device 1110, again as an autonomous driving computing system for controlling vehicle 200.

As an example, computing device 1110 may interact with one or more actuators or other such components of the deceleration system 1160, acceleration system 1162, and/or power system 1174, such as brakes, accelerator pedal, and/or the engine or motor of the vehicle, in order to control the speed of the vehicle. Similarly, one or more actuators or other such components of the steering system 1164, such as a steering wheel, steering shaft, and/or pinion and rack in a rack and pinion system, may be used by computing device 1110 in order to control the direction of vehicle 200. For example, if vehicle 200 is configured for use on a road, such as a car or truck, the steering system may include one or more actuators or other such devices to control the angle of wheels to turn the vehicle. Signaling system 1166 may be used by computing device 1110 in order to signal the vehicle's intent to other drivers or vehicles, for example, by lighting turn signals or brake lights when needed.

Navigation system 1168 may be used by computing device 1110 in order to determine and follow a route to a location. In this regard, the navigation system 1168 and/or data 1132 may store detailed map/roadmap information, e.g., highly detailed maps identifying the shape and elevation of roadways, lane lines, intersections, crosswalks, speed limits, traffic signals, buildings, signs, real time traffic information, vegetation, or other such objects and information.

Positioning system 1170 may be used by computing device 1110 in order to determine the vehicle's relative or absolute position on a map or on the earth. For example, the positioning system 1170 may include a GPS receiver to determine the positioning system's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 1170 may also include other devices in communication with computing device 1110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 1110, other computing devices and combinations of the foregoing.

The perception system 1172 may also include one or more components for detecting subjects external to the vehicle such as other vehicles, obstacles in the roadway, traffic signals, signs, trees, etc. For example, the perception system 1172 may include one or more sensors, such as sensors 301, 501, 601, 701, and 1001 and/or any other detection devices that record data which may be processed by computing device 1110. In some instances, the perception system may include a laser sensor, such as sensor 301, mounted on the roof or other convenient location of a vehicle.

The visual notification system 1176 may include LED displays for displaying messages to subjects in the vehicle's vicinity. In this regard, the visual notification may include a mounted or integrated messaging system on the housing of a sensor for targeted visual communication with drivers, pedestrians, cyclists, vehicles, or other such subjects (collectively referred to as "recipients") located outside of the vehicle. For example, the LED displays of the visual notification system 1176 may include POV LED displays and/or directional LED displays.

The computing device 1110 may use the positioning system 1170 to determine the vehicle's location and perception system 1172 to detect and respond to subjects, such as surrounding vehicles, pedestrians, railroad crossing, etc., when needed to reach the location safely. In order to do so, computing devices 1110 may cause the vehicle 200 to accelerate (e.g., by increasing fuel or other energy provided to the engine by acceleration system), decelerate (e.g., by decreasing the fuel supplied to the engine, changing gears, and/or by applying brakes by deceleration system), change direction (e.g., by turning the front or rear wheels of vehicle by steering system), and signal such changes (e.g., by lighting turn signals of signaling system). Thus, the acceleration system 1162 and deceleration system 1160 may be a part of a drivetrain that includes various components between an engine of the vehicle and the wheels of the vehicle. Again, by controlling these systems, computing devices 1110 may also control the drivetrain of the vehicle in order to maneuver the vehicle autonomously.

Based on data received from the various system components, the computing devices may control the direction, speed, acceleration, etc. of the vehicle by sending instructions to the various components of the vehicle. For instance, the computing devices 1110 may navigate the vehicle to a destination location completely autonomously using data from the map information and navigation system 1168 and positioning system 1170. The computing devices 1110 may also provide notifications to surrounding subjects via the visual notification system 1176 as described herein during the vehicle's operation.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

A computing device, such as computing device 1110, may determine when and where to display a particular message. In this regard, data received from the perception system 1172 and navigation system 1168 may be monitored to determine whether communication with a subject in the vehicle's vicinity is warranted. Messaging may be warranted when the computing device determines the probability of the subject interacting with the vehicle is sufficiently high.

Figure 12:
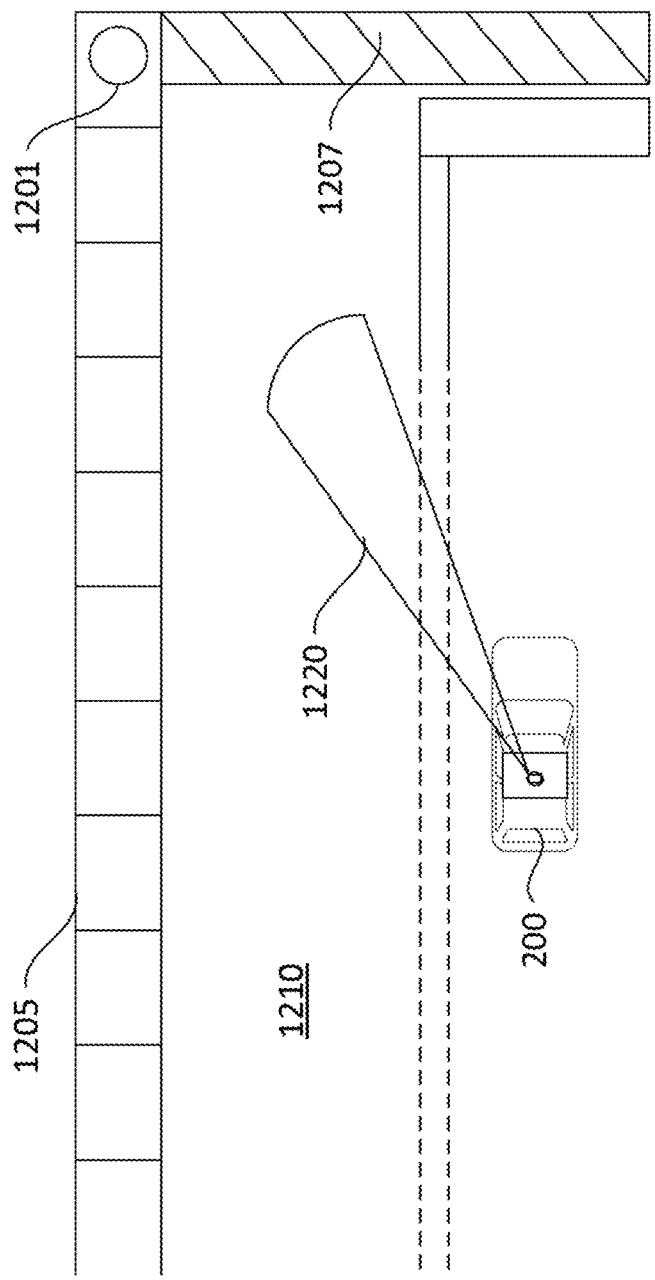
FIG. 12 is an example of an LED display providing a notification to a pedestrian in accordance with aspects of the disclosure.

Probability of the subject interacting with the vehicle may be based on the type of subject and its anticipated actions. In this regard, based on data from the perception system 1172, the computing device 1110 may determine the locations and trajectories of subjects in the vehicle's vicinity, as well as the subject type (e.g., vehicle, pedestrian, etc.) Based on these factors, a probability of whether the vehicle will or may interact with the subject may be made. For subjects with a probability that satisfies a threshold, a message may be output by the vehicle's visual notification system 1176. For example, a pedestrian 1201 on a sidewalk 1205 may be attempting to cross a road 1210 at a crosswalk 1207 in front of a vehicle, such as vehicle 200 shown in FIG. 12. The computing device 1110 may determine there is a high level of probability, such as, by way of example, a 60% chance that the pedestrian 1201 will cross in front of the vehicle. In response, the computing device 1110 may cause the vehicle 200 to brake (for instance, slow down and/or stop) and output a message informing the pedestrian 1201 that he or she can cross the road safely. For instance, the LED display of the visual notification system 1176 of vehicle 200 may direct a message which says "Please Proceed" in the direction of the pedestrian 1201, as shown by area 1220 in FIG. 12. In another example, the vehicle may pull up to a four way stop. In the event a second, third, and/or fourth vehicle is at the four way stop, the vehicle may provide a notification to the other vehicles that they may proceed first or that the vehicle is going to move.

In some instances, the LED displays may serve as a redundant or fallback notification system. On most vehicles, lights, such as tail lights, brake lights, turn signals, etc., including those found in the signaling system 1166, are used to provide information to surrounding subjects. For instance, brake lights inform subjects behind the vehicle that the vehicle is stopping and turn signals inform subjects surrounding the vehicle that the vehicle is turning. In the event these lights unknowingly fail, the LED display may provide the necessary notification. For instance if the right turn signal fails, the LED display may provide a "Turning right" message.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A display mounted messaging system, the system comprising:
   a computing device including one or more processors configured to determine a probability of a vehicle interacting with a subject and to cause an LED controller to provide a message, based, at least in part, upon the determined probability, in a direction of the subject;
   a light emitting diode (LED) display attached to a housing of a sensor, wherein the housing of the sensor rotates; and
   the LED controller, wherein the LED controller is configured to selectively activate and deactivate at least one LED in the LED display, to provide the message.

2. The system of claim 1, wherein the at least one LED in the LED display is part of a LED strip comprising a plurality of LEDs.

3. The system of claim 2, further comprising the sensor and one or more strips of LEDs mounted to one or more supports attached to the housing of the sensor.

4. The system of claim 2, wherein the plurality of LEDs of the LED strip are integrated into a housing of the sensor.

5. The system of claim 2, further comprising one or more lenses, wherein the one or more lenses are configured to redirect light emitted by the at least one of the plurality of LEDs.

6. The system of claim 5, wherein the one or more lenses are configured to move relative to the LED strip.

7. The system of claim 6, further comprising a motor configured to move the one or more lenses.

8. The system of claim 5, wherein the LED strip is configured to move relative to the one or more lenses.

9. The system of claim 8, further comprising a motor configured to move the LED strip.

10. The system of claim 5, wherein the one or more lenses are configured to redirect the light to one or more heights based on a height of the subject.

11. The system of claim 5, wherein the one or more lenses are configured to redirect the light toward the subject.

12. The system of claim 5, wherein the one or more lenses are integrated into the sensor housing.

13. The system of claim 1, further comprising a motor, wherein the motor is configured to rotate the housing of the sensor and the LED display simultaneously.

14. The system of claim 13, wherein the LED display and the housing of the sensor rotate at a same rate.

15. The system of claim 1, further comprising one or more lenses, wherein the one or more lenses are configured to redirect light emitted by the at least one LED.

16. The system of claim 1, wherein the sensor is mounted on the vehicle.

17. The system of claim 16, further comprising the vehicle.

18. The system of claim 1, wherein the one or more processors are further configured to determine the probability further based on a location of the subject.

19. The system of claim 1, wherein the one or more processors are further configured to determine the probability further based on a possible trajectory of the subject.

20. The system of claim 1, wherein the one or more processors are further configured to determine the probability further based on a type of the subject, wherein the type of the subject includes pedestrian, bicyclist, or one or more types of vehicles.

21. The system of claim 20, wherein the one or more types of vehicles include at least a car, a truck, a motorcycle, and a bus.

22. The system of claim 1, wherein the one or more processors are further configured to determine whether the probability satisfies a threshold, and wherein causing the LED controller to provide the message is further based on the determination of whether the probability satisfies the threshold.

\* \* \* \* \*